Jan. 14, 1936.            G. J. CHRISTIAN            2,027,633
                      ROOT CUTTER FOR SEWER PIPES
                          Filed Aug. 14, 1933
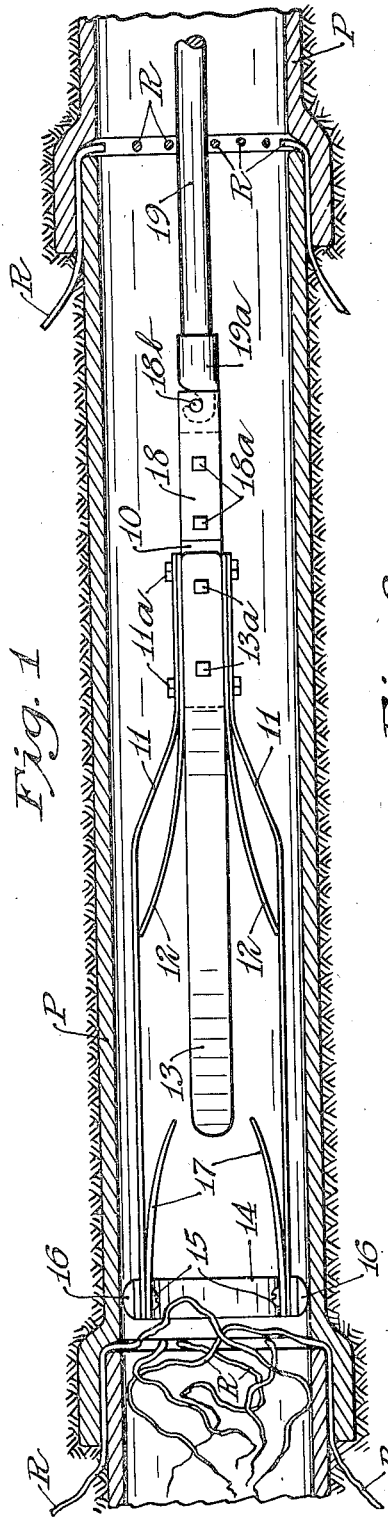
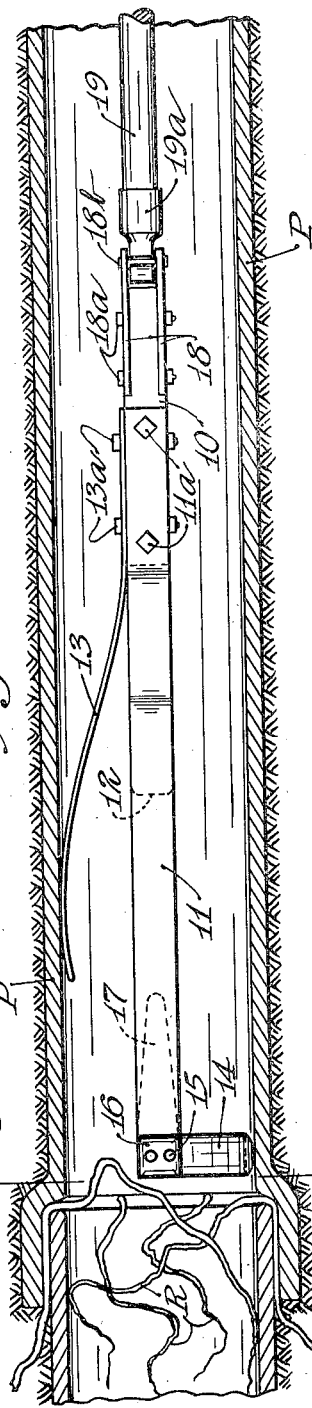
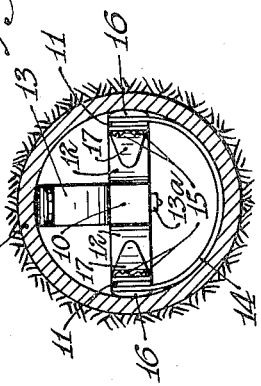
Inventor
George J. Christian
By his Attorneys
Williamson & Williamson Patented Jan. 14, 1936

2,027,633

UNITED STATES PATENT OFFICE 2,027,633

ROOT CUTTER FOR SEWER PIPES

George J. Christian, Northfield, Minn.

Application August 14, 1933, Serial No. 685,003

1 Claim. (Cl. 15—104.30)

My invention relates to a root cutter for use in sewer pipes.

In many places sewer pipes become clogged by the growth therewithin of tree roots which have found their way thereinto through the joints between sections of pipe. It is highly desirable to have means for removing such roots without the need of digging up the pipes.

It is an object of my invention to provide a cutting tool which is capable of being used to chop or cut off roots and withdraw the same from the interior of a sewer pipe.

Another object is to provide such a cutting tool which is simple, compact and rugged and is easily introduced into a pipe in which it is to be used.

These and other objects and advantages of the invention will be more fully set forth in the following description made in connection with the accompanying drawing, in which like reference characters refer to similar parts throughout the several views, and in which:—

Fig. 1 is a side view of my root cutter shown in operative relation with a sewer pipe, the cutter being shown in full and the pipe in section;

Fig. 2 is another side view similar to the view in Fig. 1, but taken at right angles thereto, and Fig. 3 is a cross sectional view taken along the line 3—3 of Fig. 2 as indicated by the arrows.

Referring to the drawing, 10 is a shank formed of hard wood or other suitable material and preferably of square cross-section. A pair of flat elongated frame members 11 are secured at corresponding ends thereof to the shank 10 by bolts 11a or other suitable means. The frame members 11 diverge forwardly and outwardly from adjacent the forward end of the shank 10 for a relatively short distance and then extend further forwardly in parallel relation to each other and to the longitudinal axis of the shank 10.

Resilient braces 12 are clamped at corresponding ends between the respective ones of the flat members 11 and the shank 10 and curve forwardly and outwardly from adjacent the forward end of the shank 10 to bear at their free ends against the inner sides of the medial portions of the respective ones of the frame members 11.

An elongated guide leaf or spring 13 is secured at its rearward end to one of the remaining two sides of the shank 10 by means of the bolts 13a. The guide spring 13 extends forwardly and outwardly from adjacent the forward end of the shank 10 and is curved inwardly at its free and outer end portion.

An arcuate cutter bar 14, formed of flat material and having both edges sharpened is curved to have a substantially semicircular shape. The end portions of the cutter bar 14 are secured to the free end portions of the respective ones of the frame members 11 by means of screws 15 which extend outwardly through suitably apertured portions of the cutter bar 14 and the frame members 11. A rectangular block 16 having internally screw-threaded apertured portions is located immediately outward of each of the apertured end portions of the cutter bar 14 and the outer portions of the screws 15 are threadedly engaged with the apertures in the block 16. The cutter bar is disposed on the opposite side of the frame members 11 from the guide spring 13 in substantially concentric relation with the longitudinal axis of the shank 10.

A material-withdrawing horn 17, formed of flat material, is clamped at its forward end between the forward end of each of the frame members 11 and the heads of the screws 15 associated therewith. The free portion of each of the horns 17 extends rearwardly and inwardly so that the pair of horns converges rearwardly and each horn diverges rearwardly with respect to the frame member 11 with which it is associated.

The frame members 11, the braces 12, cutter bar 14, and the horns 17 are preferably constructed of strong, somewhat resilient material such as tool steel or the like.

A suitable fitting for connection to conventional forms of sectional rodding such as used in underground pipes and conduits is secured to the rear end of the shank 10. As shown in the drawing, a pair of plates 18 are secured by means of bolts 18a to opposite sides of the rear portion of the shank 10 and extend somewhat rearwardly therefrom. A cross-pin 18b is secured at its respective ends in suitable apertures in the rearwardly extending portions of the plates 18. A rod section 19 of one of the types available carries a hook-like attachment fitting 19a on the forward end thereof which is retained at its forward end between the rear portions of the plates 18 and is engaged with the cross-pin 18b. It is to be understood that various other types of fittings may be mounted on the rear portion of the shank 10 in accordance with the type of attachment fittings provided on the particular type of sectional rodding to be used. The attachment fittings used may be of any form which will transmit torque from the rod to the shank 10 and permit both pushing and pulling of the shank 10 by means of the rod.

Various sizes of cutter bars 14 may be used on my device and changing of the bar 14 is easily accomplished when the screws 15 have been removed. The resiliency of the flat frame members 11 permits spreading apart of the same to various distances to accommodate attachment thereto of various sizes of cutter bars. The braces 12 are tensioned to exert an outwardly directed pressure on the frame members 11 for all degrees of spread of the same within the limits for which the device is designed. The guide spring 13 is also tensioned to exert an outwardly directed pressure.

The blocks 16 are beveled or rounded so as to minimize the possibility of their catching on any projection.

Tree roots find entrance to the interior of a sewer pipe through the joints between pipe sections as shown in Figs. 1 and 2 and form a root structure in the interior of the pipe which ultimately obstructs the pipe.

In use of my root cutter for removing root structures from pipes a size of cutter bar 14 is selected which has a radius of curvature similar to that of the interior of the pipe. The device is introduced into a pipe through an open end thereof or any other suitable entrance with the end on which the cutter bar is mounted leading. A section of rod 19 is attached to the fitting 18 of the device and the device is pushed further into the pipe by means of the rod. By alternately adding sections of rod and pushing the same into the pipe the cutter is projected to the point at which the obstruction is located.

The last attached section of rod is reciprocated to produce chopping action of the cutter whereby the roots are chopped off by the cutter bar. It is to be noted that the double edged cutter bar is capable of cutting or chopping either when projected forwardly or when drawn rearwardly. If roots are present at all sides of the pipe the rod may be rotated through successive portions of a revolution to dispose the cutter bar successively in positions adjacent the top, bottom and sides of the pipe whereby roots may be chopped while the cutter bar is in each of the several positions.

If the pipe being cleared is not a dead-ended pipe a substantial stream of water may be introduced into the pipe to carry away the severed pieces of root. If the pipe is a dead-ended pipe continued reciprocation of the cutter can be made to wedge pieces of root between the horns 17 and the flat frame members 11 after which the pieces of root so caught may be withdrawn from the pipe along with the cutting device.

The cutting device is withdrawn from the pipe by pulling on the sectional rod, each section of rod being detached as soon as the next section is within reach.

The horns 17 may or may not be used with the cutter depending upon whether water is used to carry away the severed pieces of root or whether it is necessary to withdraw the pieces.

It is apparent that I have invented a novel, rugged, effective and easily operated root cutter for use in sewer pipes whereby root growths within such pipes may be removed without the necessity of digging up the pipes.

It will, of course, be understood that various changes may be made in the form, details, proportions and arrangement of the parts without departing from the scope of my invention, which, generally stated, consists in a device capable of carrying out the objects above set forth, in the novel parts and combinations of parts disclosed and defined in the appended claim.

What is claimed is:—

In a root cutter for use in sewer pipes and the like, a shank, a pair of elongated frame members attached to said shank and extending forwardly and outwardly from one end thereof in spaced relation, an arcuate cutter bar secured at two portions thereof to the forward portions of the respective frame members so as to be disposed in substantially concentric relation to the axis of said shank and a pair of resilient elements both secured to said shank and respectively bearing outwardly against the medial portions of said frame members to exert outward pressure thereon.

GEORGE J. CHRISTIAN.